May 24, 1960
D. PARRETT
2,937,721
ACTUATOR MEANS FOR MECHANICALLY AND
HYDRAULICALLY OPERATED DISC BRAKES
Filed June 6, 1957
5 Sheets-Sheet 1
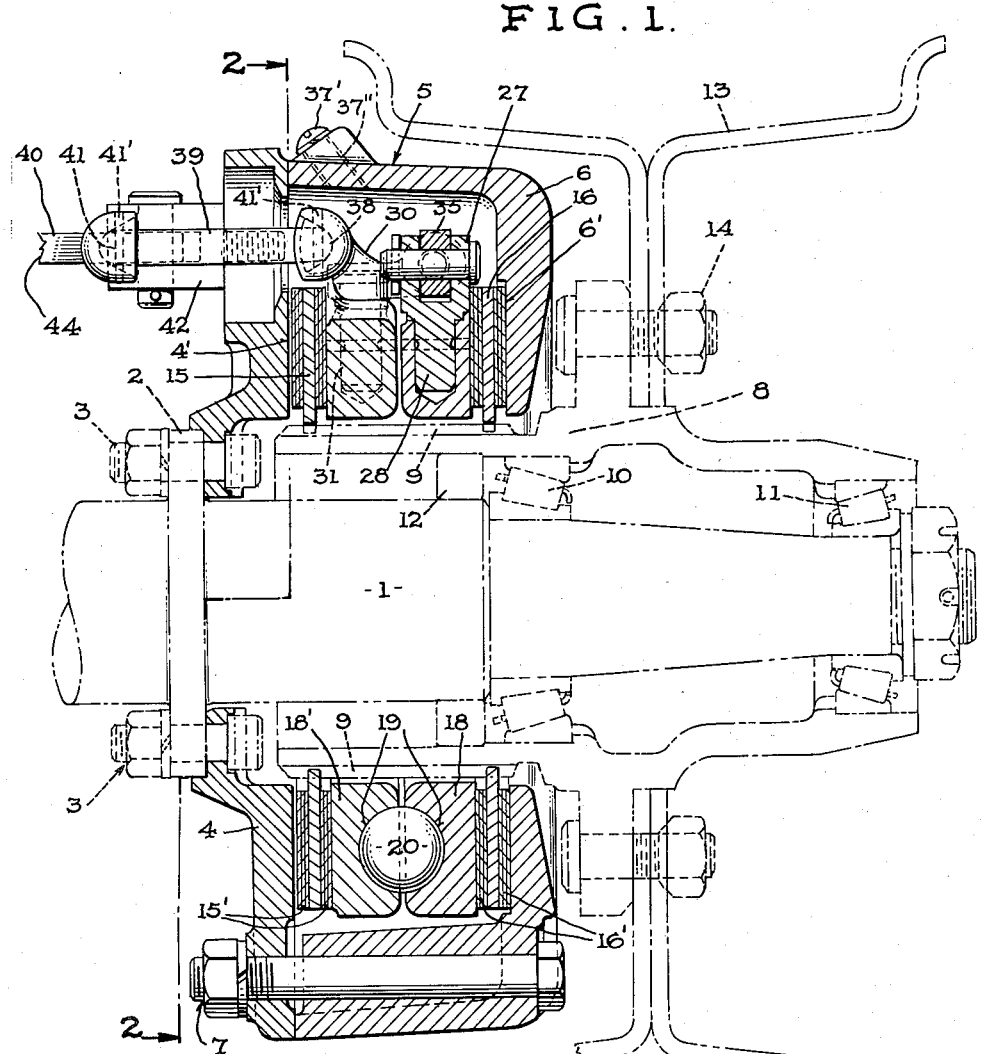
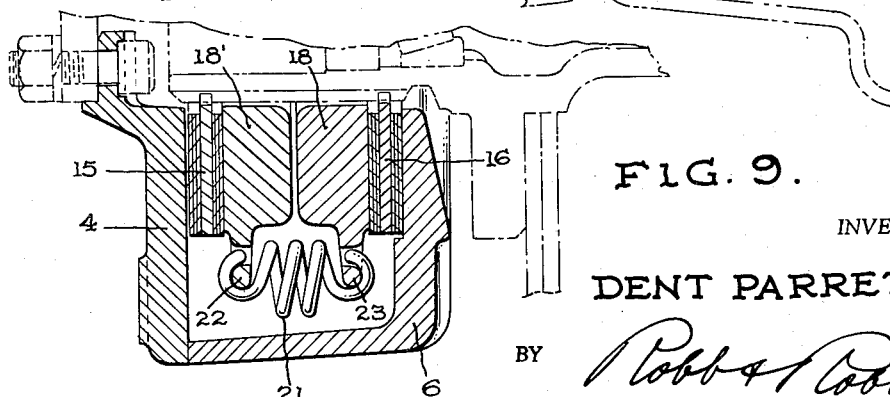
INVENTOR
DENT PARRETT
BY
ATTORNEYS May 24, 1960

D. PARRETT 2,937,721

ACTUATOR MEANS FOR MECHANICALLY AND
HYDRAULICALLY OPERATED DISC BRAKES

Filed June 6, 1957

INVENTOR
DENT PARRETT
BY
ATTORNEYS

May 24, 1960

D. PARRETT 2,937,721

ACTUATOR MEANS FOR MECHANICALLY AND
HYDRAULICALLY OPERATED DISC BRAKES

Filed June 6, 1957

INVENTOR

DENT PARRETT

BY *Robert Cobb*

ATTORNEYS

May 24, 1960
D. PARRETT
2,937,721
ACTUATOR MEANS FOR MECHANICALLY AND
HYDRAULICALLY OPERATED DISC BRAKES
Filed June 6, 1957
5 Sheets-Sheet 4
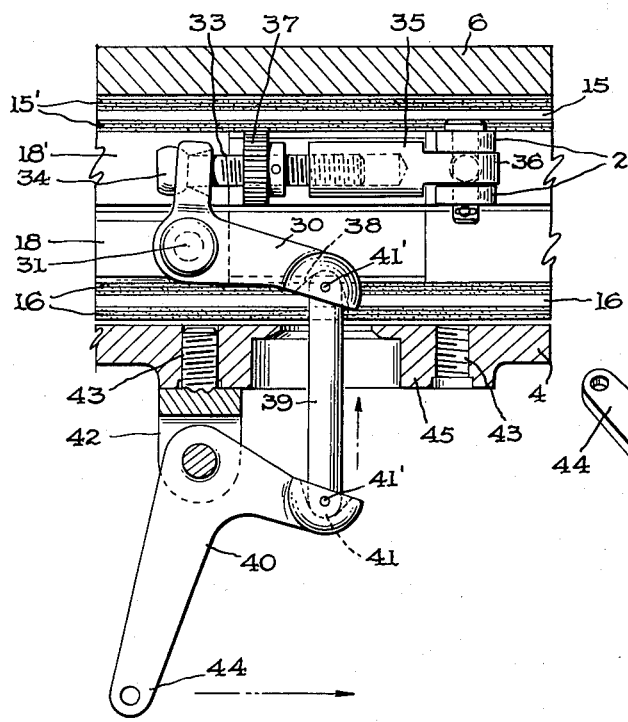
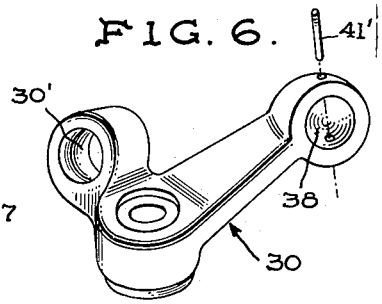
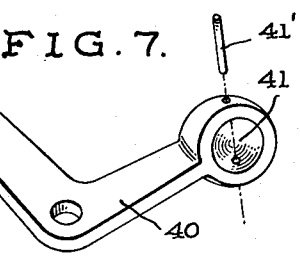
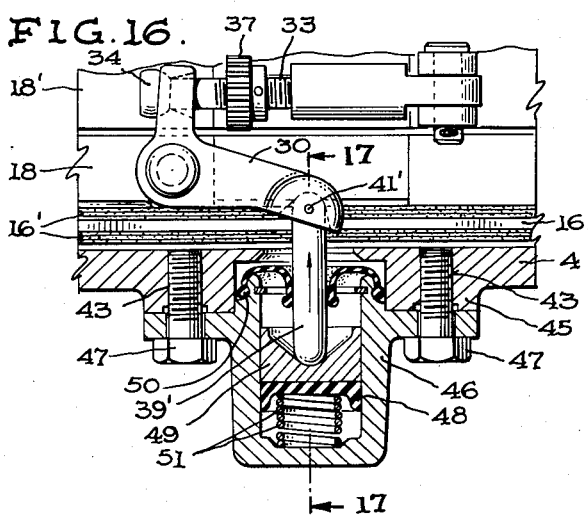
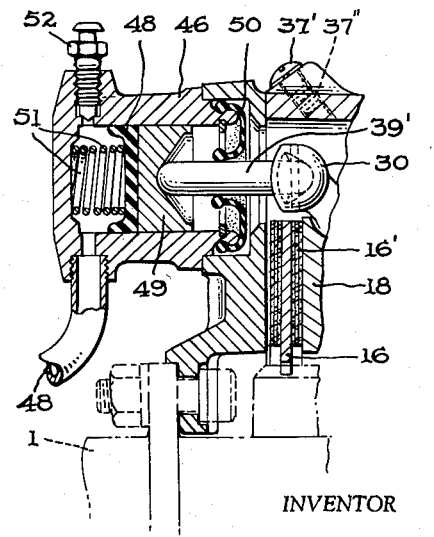
INVENTOR
DENT PARRETT
BY
ATTORNEYS

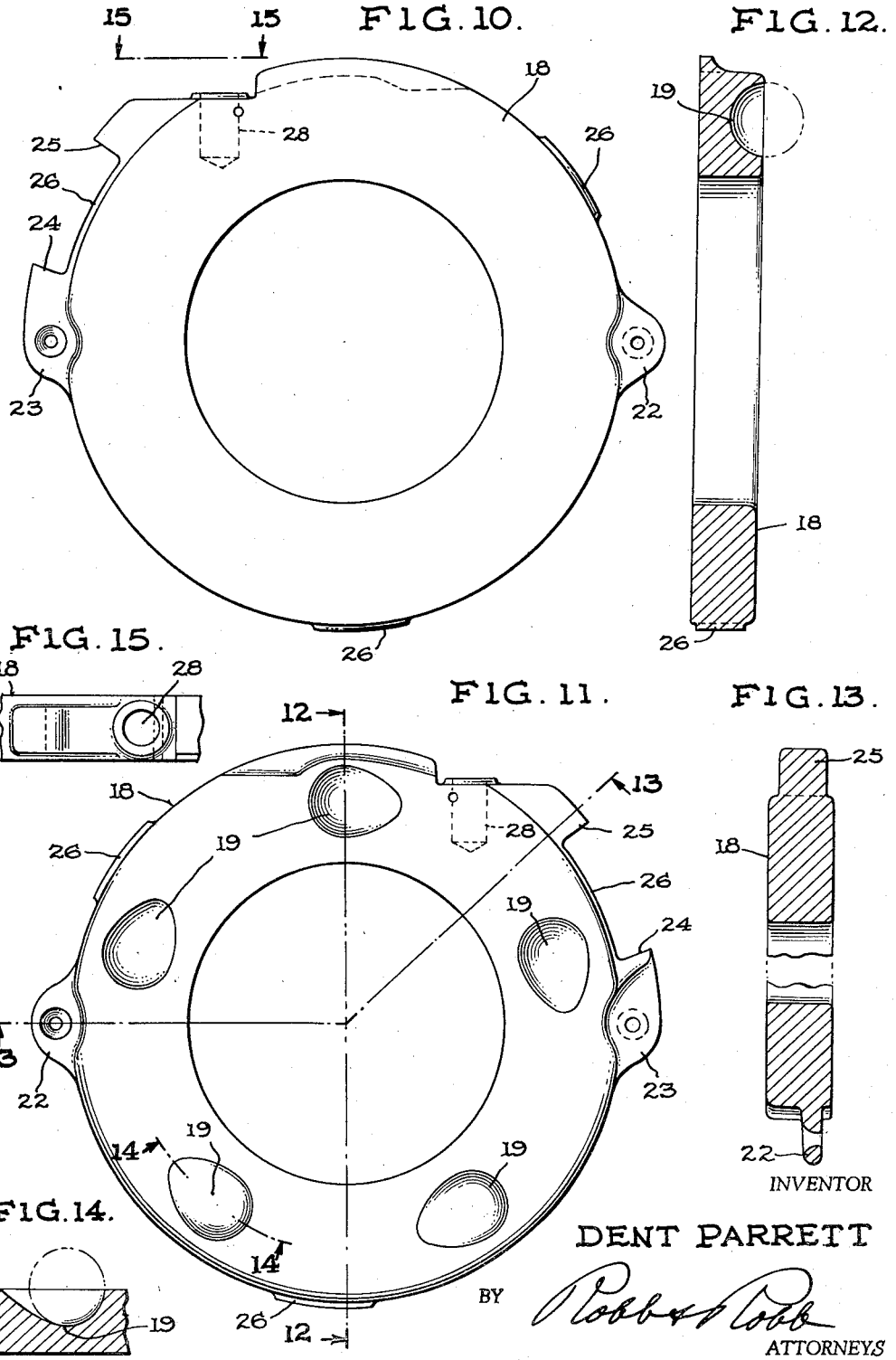

United States Patent Office 2,937,721
Patented May 24, 1960

2,937,721

ACTUATOR MEANS FOR MECHANICALLY AND HYDRAULICALLY OPERATED DISC BRAKES

Dent Parrett, St. Joseph, Mich., assignor, by mesne assignments, to Lambert Brake Corporation, St. Joseph, Mich., a corporation of Michigan Filed June 6, 1957, Ser. No. 664,126

17 Claims. (Cl. 188—72)

The present invention relates to friction devices, and more particulraly to improved actuator or operator means for mechanically and hydraulically operated disc brakes of the servo-actuated type, and intended for use on vehicles of both the self-propelled and the drawn class, as well as on other machinery or implements having a rotary member to be braked.

Some servo-actuated disc brakes of a well-known type utilize a brake actuating unit or assembly comprising a pair of complemental slightly relatively rotatable actuating disc which are piloted at their outside diameter on coaxial bearing surfaces of torque limiting abutments on a housing, and are provided with self-energizing camming means therebetween for separating said complemental brake actuating discs when one or the other of said discs is anchored against rotary movement by a torque limiting abutment or lug on the relatively fixed housing as operating force or stress is applied to said actuating discs tending to impart relative rotation thereto, said separating action of the actuating discs in turn effecting a retarding or braking of rotary friction discs attached to a rotary member to be braked.

The aforementioned force for imparting relative rotation to the actuating discs has usually been a radially exerted operating force applied through means of mechanical linkage in a plane substantially in line with or parallel to the plane of the brake actuating unit and to concentric axially extended bearing surfaces therefor within the housing.

The reaction of said radially exerted force or stress as applied to the above-mentioned prior art brakes, has usually been concentrated at the actuating-disc-piloting diameter or disc-bearing surfaces of the torque limiting abutments nearest the line of the operating stress. This concentration of operating stress has resulted in excessive bearing loads at the aforementioned pilot diameter or bearing surfaces of the torque limiting abutments, and thereby has considerably reduced the efficiency of the self-energizing action of the brake in that frictional force coincident to the excessive bearing loads aforementioned works against the self-energizing means during the braking action, resulting in an uneven distribution of brake applying force.

Accordingly, the principal object of this invention is to provide an improved brake operator means for mechanically and hydraulically operated disc brakes of the relatively stationary double-disc type, wherein the initial operating stresss or force is applied in a plane substantially perpendicular to the plane of the brake actuating disc unit, thus eliminating excessive radial bearing stress at said piloting diameter or bearing surfaces of the torque limiting abutments on the housing. By so doing, the self-energizing function of the brake attains a more efficient and uniform distribution of axial braking force on the friction surfaces of the brake, with resultant more even distribution of the heat generated thereby.

Another object of this invention is to provide an improved brake operating assembly for brakes of this type having a slightly relatively rotatable double-disc actuating unit of the type aforementioned, said assembly including a bellcrank lever and linkage system or means for pivotally effecting relative rotation and consequent separation of the respective complemental actuating discs, and so disposed as to be responsive to an operating force applied in a plane generally perpendicular to the plane of the actuating disc unit or assembly, which thereby tends to eliminate the aforementioned excessive radial bearing loads and allows the brake to function more freely and uninhibited.

A further object of the invention is to provide a simple but efficient manual adjuster means to compensate for brake lining wear in brakes of this class.

Other objects and advantages of the invention will become apparent from the following detailed description, taken in connection with the accompanying drawings, and the novel features thereof will be defined in the appended claims.

In the drawings:

Fig. 1 is a cross-sectional view through a mechanically operated brake and actuator according to one form of this invention, as seen substantially on line 1—1 of Fig. 2, with certain parts shown in full elevation and others shown in broken outline;

Fig. 5 is a horizontal sectional view as taken on line 5—5 of Figs. 2 and 3, showing the mechanical brake operating linkage and adjuster means in plan;

Fig. 6 is a perspective view of one of the bellcrank levers;

Fig. 7 is a perspective view of another of the bell-crank levers;

Fig. 9 is a fragmentary cross-sectional view as taken substantially on line 9—9 of Fig. 2, showing the return spring means for holding the actuating discs in their assembled relationship;

Fig. 10 is an elevation view of one side of one of the two identical actuating discs;

Fig. 11 is an elevation view of the other side of the actuating disc of Fig. 10;

Fig. 12 is a cross-sectional view through one of the actuating discs as taken on line 12—12 of Fig. 11;

Fig. 13 is a cross-sectional view through one of the actuating discs as taken on line 13—13 of Fig. 11;

Fig. 14 is a fragmentary longitudinal cross-sectional view through one of the energizing ball seats of one of the actuating discs as taken on line 14—14 of Fig. 11;

Fig. 15 is a fragmentary top plan view of a portion of one of the actuator discs, showing the mounting hole detail for a part of the actuating linkage;

Fig. 16 is a horizontal cross-sectional view through the upper portion of a hydraulically operated brake embodiment and the hydraulic actuating cylinder therefor, said brake otherwise being similar to Fig. 5; and Fig. 17 is a fragmentary vertical cross-sectional view through the hydraulic brake actuating mechanism as taken substantially on line 17—17 of Fig. 16.

Figure 2:
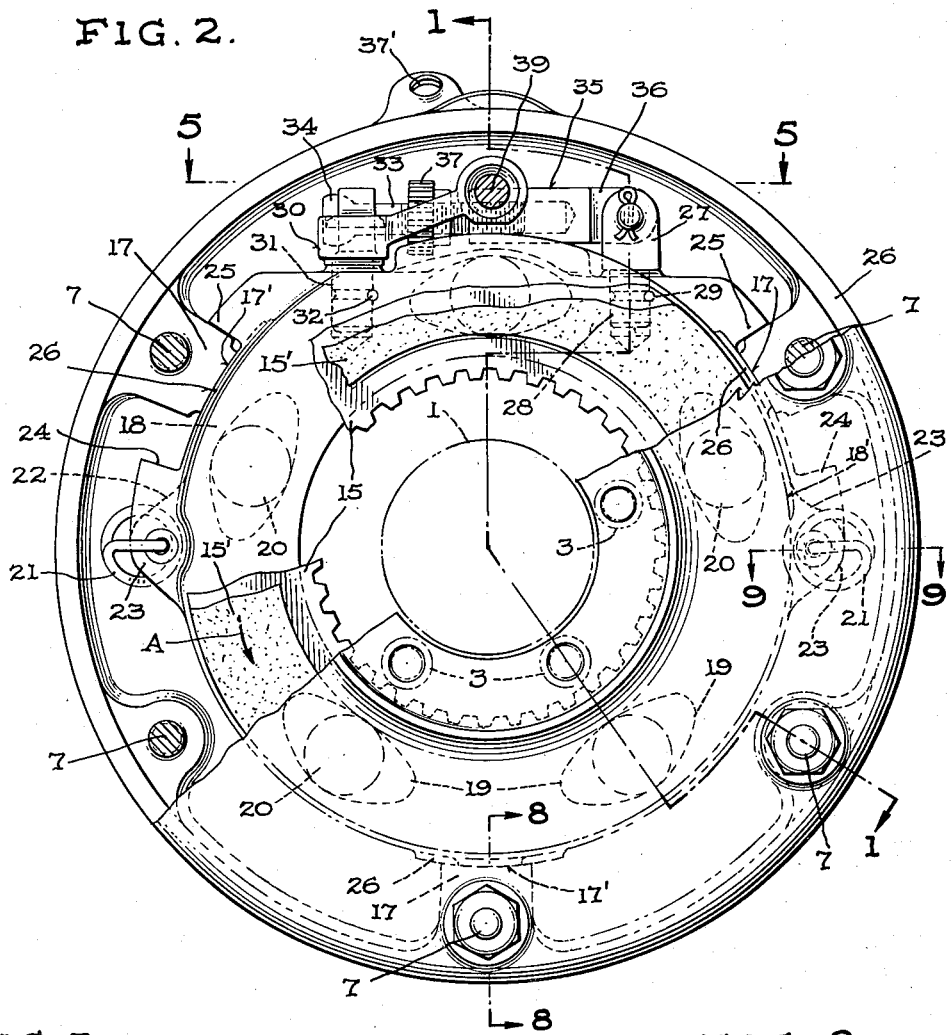
Fig. 2 is an inboard elevation view, with the inboard housing member partially broken away to better show the inner double-disc construction and relationship of the brake components as viewed substantially on line 2—2 of Fig. 1.
Figure 3:
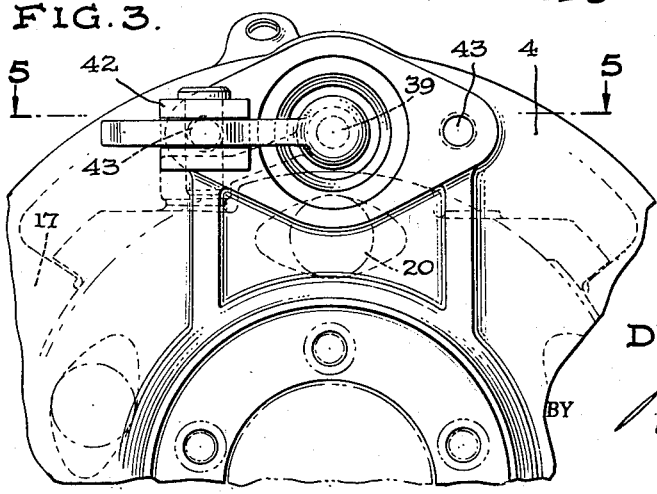
Fig. 3 is a fragmentary inboard elevation view of the upper portion of the brake and mechanical operating linkage therefor.

Like reference characters designate corresponding parts in the several figures of the drawings, wherein for the purpose of illustrating one practical embodiment, a trailer-type brake with a non-rotating axle is shown in the drawings, although the brake of this invention is adaptable to other vehicles, and is more particularly adaptable to such vehicles as tractors, airport hauling equipment, house trailers and the like.

In the illustrated brake adaptation, a non-rotating or "dead" axle generally designated 1 and having a suitably apertured mounting flange 2, both being shown in phantom dash-dot outline, is utilized. Securely anchored by means of bolt and nut assemblies 3 to flange 2 is the inboard housing member 4 of a preferably two-part stationary hollow housing generally indicated at 5. An outboard housing member 6 is secured to the inboard housing member 4 by means of a plurality of circumferentially spaced bolt and nut assemblies 7.

A wheel hub 8 having external splines at 9 is suitably mounted on axle 1 with appropriate roller bearing assemblies 10 and 11 and oil seal 12 disposed therebetween. A wheel 13 is mounted on the hub 8 by means of bolt and nut assemblies 14. The aforementioned parts 8–14 are shown in dash-dot outline.

The hollow housing 5 is provided with spaced and opposed radially extended friction surfaces 4' and 6' respectively against which lining members 15' and 16' of the spaced rotary friction disc assemblies 15 and 16 engage during braking action. The inner peripheries of disc assemblies 15 and 16 are provided with splines which complementally engage the splines 9 of the wheel hub 8. Disc assemblies 15 and 16 are thereby adapted for both axial and rotative movements.

Figure 8:
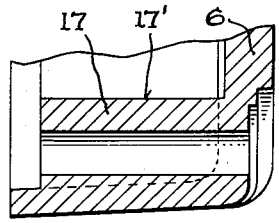
Fig. 8 is a fragmentary sectional view through the inboard housing member only, as taken on line 8—8 of Fig. 2, showing the detail of the torque limiting anchor or abutment.
Figure 4:
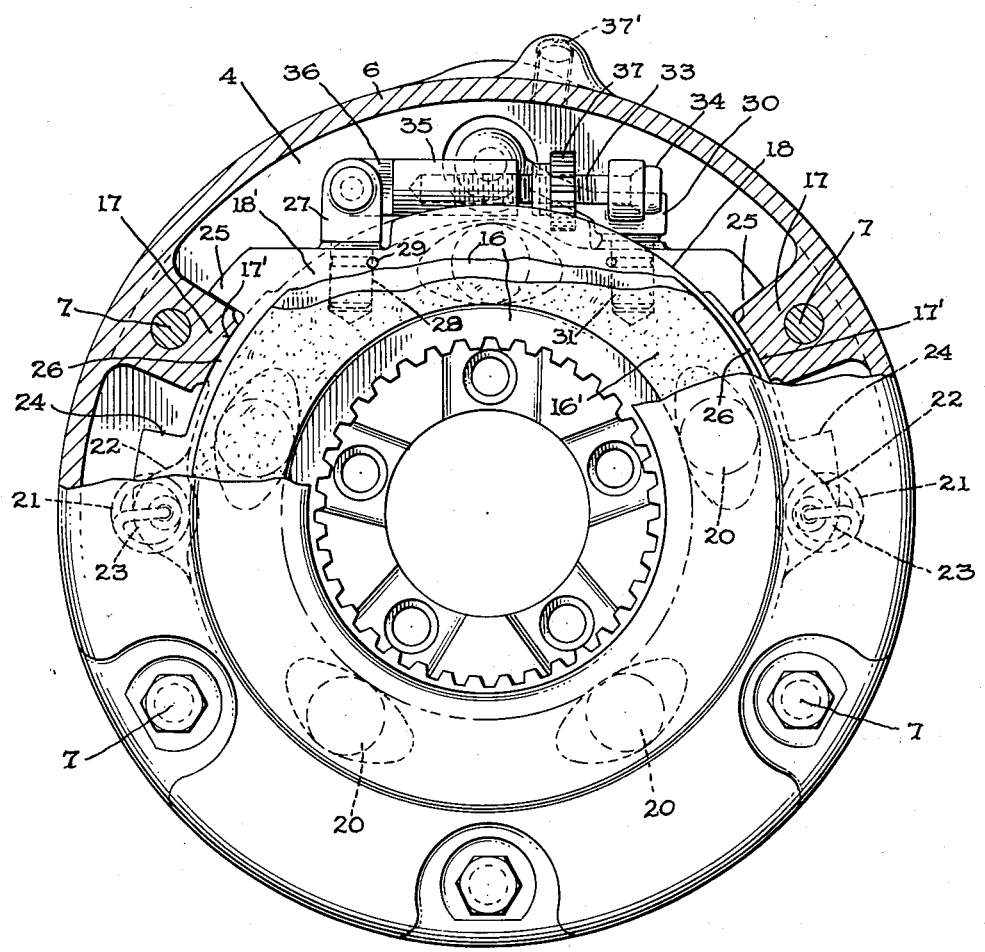
Fig. 4 is an outboard elevation view of the brake of Fig. 1, with a portion of the housing broken away to better expose the inner components, and with the axle omitted for clarity.

Provided at circumferentially spaced intervals about the inside of the outer shell-like periphery of outboard housing section 6 are a plurality of co-axial disc piloting and torque limiting projections or lugs 17 as best seen in Figs. 2, 4 and 8.

Slightly rotatively and axially shiftably mounted or piloted on said piloting lugs 17 and disposed between the spaced friction disc assemblies 15 and 16 within the housing, is a double-disc assembly comprising a pair of preferably identical relatively rotatable discs 18 and 18' which are disposed in back-to-back relation, said discs having a plurality of circumferentially spaced ramped seats 19 in the opposed faces thereof and in which are disposed a like number of camming balls 20. The discs are resiliently urged together by means of a plurality of brake-release springs 21, thereby confining the balls 20 in the seats 19. For illustrative purposes, a pair of springs 21, 21 are disposed in diametrically spaced relation and inter-connected between radially outwardly projecting ears 22 and 23 on the respective discs 18 and 18'. One of the ears 23 of each disc is extended circumferentially and formed with a stop shoulder 24 for engagement with one face of one of the disc-supporting or piloting projections 17. A similar second stop shoulder 25, for engagement with the opposite face of the projection 17, is provided in circumferentially spaced relation to shoulder 24 (the complete details of the disc being more clearly seen in Figs. 10 to 15). In addition, each disc 18 and 18' is preferably provided on its outer periphery with a plurality of arcuate bearing sections projecting radially therefrom as at 26 for complemental bearing engagement with the bearing surfaces 17' of projections 17. It will be noted that one of such bearing sections 26 is disposed between the radially projecting stop shoulders 24 and 25 of the disc 18.

It will be apparent that the double-disc assembly is concentrically supported with relation to the axle and each of the discs 18 and 18' is freely disposed for limited rotative movement in opposite directions relative to the other, each being rotatively limited by the aforementioned stop shoulders 24 and 25 coacting with the torque limiting lugs 17.

While the brake of this invention is readily adaptable to both mechanical and hydraulic actuation, as will be seen hereinafter, one form of a mechanical operator or actuating mechanism, will now be described. As best seen in Figs. 1 to 7, a dual bellcrank lever and linkage mechanism operatively connected to the double-disc actuating assembly is utilized to operate the brake.

A clevis 27 having a depending mounting pin or stud is preferably slip-fit into a mating hole 28 provided in the outboard actuating disc 18' and retained therein by means of a transverse lock pin 29. In a similar manner, a pivotal bellcrank lever 30 is secured on the inboard actuating disc 18 by means of bellcrank pin 31 passing through bellcrank 30 and fitting into the corresponding mating hole of said disc 18. A lock pin 32 similarly locks said pin 31 in place. The shorter arm of bellcrank 30 is provided with a hole 30', said hole being preferably spherically formed at one side of the arm (as best seen in Figs. 4 and 5) to allow universal movement with a rounded head 34 of a threaded actuator pin portion 33 of an adjustable actuator link assembly, said actuator link assembly further including an internally threaded sleeve member 35 having an eye portion 36 at its end opposite the internal thread portion, and by means of which said eye portion 36 operatively connects the said actuator link assembly in a vertically pivotal manner between the up-standing ears of the clevis 27 as by a suitable clevis pin and cotter key. Also secured on the threaded stem portion of actuating pin 33 as by means of a pin, and suitably disposed between the spherical head 34 and the sleeve member 35, is an adjusting wheel 37, which by appropriate rotation can adjust the length of actuator link assembly.

The end of the longer arm of bellcrank lever 30 is provided with a spherical recess and seat 38 (better seen in Figs. 5 and 6) to receive one end of a push rod 39 having apertured spherical ends, the other end of said push rod seating in a similar spherical recess 41 of another bellcrank lever or other operating member 40. The push rod 39 has its ends pivotally secured in their respective spherical seats by means of lock pins 41', 41'.

The operating bellcrank lever 40 is pivotally carried on the inboard housing section 4 by means of a mounting bracket or clevis 42 and pin therethrough, said bracket being threadedly secured in one of a pair of tapped mounting holes 43, 43. The other end 44 of operating lever 40 is suitably apertured for attachment to the standard brake operating mechanism of the vehicle (not shown).

In order to operate the brake, slight rotation of one of the actuating discs relative to the other to thus cause axial spreading or separation of the discs by means of the camming balls 20 therebetween, is effected by pulling on the end 44 of lever 40 in the direction of the arrow (Fig. 5). The lever 40 causes push rod 39 to pivotally push bellcrank lever 30, which in turns tends to effect a clockwise rotation of actuating disc 18 and a counter-clockwise relative rotation of the other actuating disc 18' as viewed from the inboard side of the disc assembly (see Fig. 5). However, in the construction of the illustrated embodiment, the inboard actuating disc 18 is substantially precluded from rotation when braking in the direction of the arrow A in Fig. 2 by reason of its shoulder 25 abutting against the face of adjacent abutment 17 on housing 6. Therefore, only the outboard actuating disc 18' would actually move, and such movement would be in a counter-clockwise direction relative to disc 18 and thereby cause the axial separation of the actuator discs to effect self-energization of the brake as the drag torque of the friction disc assemblies 15, 16 tends to rotate the actuator discs relative to each other. In so doing, the energizing balls 20 force the discs 18 and 18' further apart and into increased frictional braking contact with the friction disc assemblies 15, 16 and respective housing braking surfaces 4' and 6'.

Assuming the vehicle is braking in the opposite direction, the outboard actuating disc 18' would be the one to abut another of the projections 17 by its shoulder 25, thus anchoring it against rotation. Therefore, when lever 40 is pulled, causing push rod 39 to exert a push against bellcrank lever 30, the inboard actuating disc 18 will be the only one to rotate and thus becomes the energizing disc.

As brake lining wear occurs, simple manual adjustment is permitted by first removing screw plug 37', preferably with a screw driver, from the top part of the housing. The screw driver may then be inserted through the plug hole 37" and used to rotate the adjusting wheel 37 in the appropriate direction to cause actuator pin 33 to thread itself further into member 35. Thus, by threadedly drawing or pulling the clevis 27 and the bellcrank 30 and the mounting pin 31 thereof closer together, a relative rotation is imparted to the actuating discs 18 and 18', whereby balls 20 climb slightly out of their ramped seats 19 to effect separation of said actuating discs to compensate for the lining wear.

It will be apparent from the foregoing that the brake of this invention will operate equally well in either direction, and the efficiency of the self-energizing action of the brake is greatly increased by elimination of excessive radial bearing loads and other shortcomings of the prior art, as pointed out in the preamble hereof, by the utilization of the novel bellcrank linkage and actuating mechanism as disclosed herein.

Keeping in mind the ease and flexibility of adapting this improved operator means to brakes employing hydraulic operation, Figs. 16 and 17 have been shown as illustrative of one hydraulic adaptation. In this hydraulic operating version, it will be noted that the bellcrank operating lever 40 and mounting bracket 42 are not used, and that a shorter push rod 39' is used in lieu of push rod 39. All other components of the brake and the bellcrank lever system remain the same except for the hydraulic actuating components to be described in the following.

The inboard housing section 4 is preferably provided with a raised boss area 45 on which a hydraulic wheel cylinder 46 is secured as by means of a pair of bolts 47 engaging in the holes 43, 43 which have been previously described, but only one of which holes is needed by bracket 42 in the mechanically actuated version described in the foregoing. It is desirable to provide both holes 43 in the inner housing section 4 even when solely intended for mechanically actuated brakes, since the hole not used for the brake lever bracket 42 on the one side would be used when the brake is mounted on the other side of the vehicle, such provision thereby giving the added advantage of making the inner housing section 4 interchangeable.

A standard master cylinder (not shown) is utilized along with a suitable fluid line 48, said line 48 providing a conduit through which hydraulic fluid is transmitted into the respective wheel cylinders. As the fluid pressure builds up within the cylinder, a thrust is exerted against sealing cup 48 and piston 49 which are slidably disposed therein, to push the push rod 39', which in turn pushes bellcrank lever 30, with the further functions being identical to the mechanically actuated version described heretofore and therefore need not be repeated.

The piston 49 as illustrated is preferably provided with a spherical seat in one face thereof to better accommodate the end of the shortened push rod 39'. A flexible sealing cap or boot 50 is employed in the manner illustrated to assure a fluid-tight assembly of the hydraulic operator.

A spring 51 is disposed within the cylinder 46, one end thereof bearing against the closed end of the cylinder and the other end seating in the sealing cup member 48 adjacent the piston 49. The spring 51 urges the cup, piston and push rod into a snug, noise-free assembly and serves to keep the push rod 39 operatively seated in the spherical seat of the piston at all times. A simple screw bleed valve 52 is further provided in the hydraulic wheel cylinder as best seen in Fig. 17.

While the specific details have been herein shown and described, the invention is not confined thereto as various changes and alterations may be made without departing from the spirit thereof as defined in the appended claims.

I claim:

1. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs, said lever having its pivotal axis extending radially of the discs and having a thrust arm disposed for response to an operating thrust exerted substantially perpendicular to the planes of the actuator discs, and said lever being operatively connected with the other of said actuator discs for imparting relative rotary movement to said actuator discs responsive to pivotal movements of said lever.

2. A friction device as defined in claim 1, wherein said operator lever comprises a bellcrank lever.

3. A friction device as defined in claim 1, wherein said operator lever comprises a bellcrank lever, one arm of said bellcrank lever having universal pivotal connection with the other of said actuator discs.

4. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs and operatively connected with the other of said actuator discs for imparting relative rotary movement to said actuator discs responsive to pivotal movements of said lever, said means operatively connecting the operator lever with the other of said actuator discs including an actuating link assembly operatively connected to the circumferential face of the outer peripheral edge of the latter actuator disc.

5. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs and operatively connected with the other of said actuator discs for imparting relative rotary movement to said actuator discs responsive to pivotal movements of said lever, said means operatively connecting the operator lever with the other of said actuator discs including an actuating link assembly operatively connected to the circumferential face of the outer peripheral edge of the latter actuator disc, said actuating link assembly including an externally threaded actuator pin having one end thereof universally connected with one arm of said pivotal operator lever, and an internally threaded sleeve member in which said threaded actuator pin is threadedly received for longitudinal adjustment of the link assembly.

6. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs and operatively connected with the other of said actuator discs for imparting relative rotary movement to said actuator discs responsive to pivotal movements of said lever, said means operatively connecting said operator lever with the other of said actuator discs including an actuating link assembly operatively connected to the circumferential face of the outer peripheral edge of the latter actuator disc, said actuating link assembly comprising an externally threaded actuator pin having one end thereof universally connected with one end of said pivotal operator lever, an internally threaded sleeve member threadedly receiving said actuator pin, and an adjusting wheel fixedly secured on said actuator pin intermediate its respective ends and so disposed as to afford longitudinal adjustment of said link assembly responsive to rotation of said adjusting wheel.

7. A friction device as defined in claim 1, wherein the friction disc means includes a pair of rotatable axially spaced friction discs disposed within the housing, each in adjacent relationship to one of the actuator discs, said friction discs being adapted for rotation with a rotary member and also adapted for free axial movements in opposite directions responsive to said relative rotative and relative axially shiftable movements of said actuator discs.

8. A friction device as defined in claim 1, wherein the housing includes a pair of stationary opposed and radially extended friction members, one of said members being provided with a plurality of circumferentially spaced and laterally directed actuator disc-piloting projections within the interior of the housing.

9. A friction device as defined in claim 1, wherein the housing includes a pair of stationary opposed and radially extended friction members, one of said members being provided with a plurality of circumferentially spaced laterally directed actuator disc-piloting projections within the interior of the housing, and wherein each actuator disc is provided with a pair of circumferentially spaced opposed radially projecting anchoring abutments for engagement with the respective disc-piloting projections to limit rotation of either actuator disc in one direction, while allowing the other actuator disc to rotate responsive to the aforementioned pivotal movements of the operator lever.

10. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs and operatively connected with the other of said actuator discs for imparting relative rotary movement to said actuator discs responsive to pivotal movements of said lever, said operator means for actuating said actuator discs including mechanically operated lever means pivotally mounted externally on said housing and operatively connected to said operator lever aforesaid, and the pivotal axis of said lever means being so disposed that the pivotal movement of the lever means is in a plane perpendicular to the planes of the actuator discs.

11. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs and operatively connected with the other of said actuator discs for imparting relative rotary movement to said actuator discs responsive to pivotal movements of said lever, said operator means for actuating said actuator discs including mechanically operated bellcrank lever means pivotally mounted externally on said housing and being operatively connected to said operator lever aforesaid, with the pivotal axis of said bellcrank lever being disposed parallel to the planes of the actuator discs.

12. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs and operatively connected with the other of said actuator discs for imparting relative rotary movement to said actuator discs responsive to pivotal movements of said lever, said operator lever comprising a bellcrank lever, a second bellcrank lever pivotally mounted externally on said housing and having one arm thereof disposed in operatively opposed relation to an arm of said first-mentioned bellcrank lever, and a push rod operatively connecting the opposed arms of the respective bellcrank levers for imparting operating pivotal movements to the first-mentioned bellcrank lever responsive to mechanically operated pivotal movements of the last-mentioned bellcrank lever.

13. A friction device as defined in claim 1, wherein the operator means includes fluid-pressure-responsive means connected to said operator lever aforesaid.

14. A friction device as defined in claim 1, wherein the operator means includes hydraulic fluid-pressure-responsive means connected to said operator lever aforesaid.

15. A friction device of the class described, comprising a housing, friction disc means in said housing including a pair of complemental actuator discs disposed for limited relative rotative and relative axially shiftable movements for effecting engagement of said friction disc means with the housing, camming means between said actuator discs for axially spreading the discs responsive to relative rotative actuation of said discs, operator means for actuating said actuator discs, said operator means including an operator lever pivotally secured intermediate its opposite ends to the circumferential face of the outer peripheral edge of one of the actuator discs and operatively connected with the other of said actuator discs for imparting relative rotary movement to said actuator discs responsive to pivotal movements of said lever, said operator means including fluid-pressure-responsive means connected to said operator lever aforesaid, said fluid-pressure-responsive means including a cylinder assembly secured externally on the housing, said cylinder assembly comprising a cylinder member having a closed outer end and an open inner end and having means for introducing a pressure fluid therein, bleed valve means provided in said cylinder member, a piston sealingly and slidingly disposed within said cylinder, a push rod operatively connecting said piston and the other end of said operator lever, sealing means for sealing said push rod and cylinder respectively against fluid pressure loss, and expansion spring means interposed between the piston and the closed end of said cylinder.

16. A friction device of the class described, comprising a pair of stationary opposed axially spaced and radially extended friction members, a pair of friction discs disposed in axially opposed relation between said friction members and adapted for rotation with a rotary member and for axial sliding movements thereon into and out of engagement with said friction members, a relatively stationary actuator disc assembly disposed between said friction discs and including a pair of actuator discs having energizing means therebetween and mounted for relative axial movement, operator means for spreading said actuator discs axially into engagement with said friction discs to shift the latter into engagement with said friction members, said operator means including a lever pivotally secured on the circumferential face of the outer peripheral edge of one of said actuator discs, said lever having its pivotal axis extending radially of the discs and having a thrust arm disposed for response to an operating thrust exerted substantially perpendicular to the planes of the actuator discs, said lever being operatively connected with the other of said actuator discs for imparting relative rotary movement to said discs responsive to pivotal movements of the lever, and resilient means urging said actuator discs towards one another to maintain a normal release clearance.

17. A friction device of the class described, comprising a pair of stationary opposed axially spaced and radially extended friction members, a pair of friction discs disposed in axially opposed relation between said friction members and adapted for rotation with a rotary member and for axial sliding movements thereon into and out of engagement with said friction members, a relatively stationary actuator disc assembly disposed between said friction discs and including a pair of actuator discs having energizing means therebetween and mounted for relative axial movement, operator means for spreading said actuator discs axially into engagement with said friction discs to shift the latter into engagement with said friction members, said operator means including a lever pivotally secured on the peripheral edge of one of said actuator discs, said lever having its pivotal axis extending radially of the discs and having a thrust arm disposed for response to an operating thrust exerted substantially perpendicular to the planes of the actuator discs, said lever being operatively connected with the other of said actuator discs for imparting relative rotary movement to said discs responsive to pivotal movements of the lever, a second lever pivotally mounted externally on one of said stationary friction members in opposed relation to the first-mentioned pivotal lever, a push rod operatively connecting the respective opposed ends of said pivotal levers, and release means urging said actuator discs toward one another to maintain a normal running clearance.

References Cited in the file of this patent

UNITED STATES PATENTS

| 1,222,929 | Campbell | Apr. 17, 1917 |
| 1,959,116 | Temple | May 15, 1934 |
| 2,096,622 | Sneed | Oct. 19, 1937 |
| 2,387,039 | Parrett | Oct. 16, 1945 |
| 2,732,036 | Myers | Jan. 24, 1956 |
| 2,799,366 | Zindler | July 16, 1957 |

FOREIGN PATENTS

| 882,100 | France | Feb. 15, 1943 |
| 599,541 | Great Britain | Mar. 15, 1948 |
| 754,529 | Great Britain | Aug. 8, 1956 |